3,271,447
LIQUID PHASE OXIDATION OF PROPYLENE TO ACRYLIC ACID IN THE PRESENCE OF AN Mn OR Ni CATALYST
Marcus A. Naylor, Jr., Wilmington, Del., assignor to E. I. du Pont de Nemours and Company, Wilmington, Del., a corporation of Delaware
No Drawing. Filed May 11, 1964, Ser. No. 366,605
4 Claims. (Cl. 260—533)

This application is a continuation-in-part of U.S. patent application Serial No. 170,246, filed January 31, 1962, now abandoned, which in turn is a continuation-in-part of U.S. patent application Serial No. 782,665, filed December 24, 1958, now abandoned.

This invention relates to a process for the catalytic oxidation of proylene to acrylic acid.

Heretofore, it has been known that olefinic hydrocarbons can be oxidized by gaseous oxygen to produce hydroxylated products, aldehydes, etc. However, it was not known heretofore that propylene could be oxidized in the liquid phase to products comprising predominantly acrylic acid.

An object of this invention is to provide an improved process for the catalytic oxidation of propylene to acrylic acid. Another object is to provide an improved process for the catalytic oxidation of propylene, in the liquid phase, to acrylic acid.

These and other objects are attained by the present invention which provides the process which comprises oxidizing propylene in the liquid phase, with molecular oxygen, in the presence of a liquid alkanoic acid and also in the presence of a catalyst comprising a salt of a metal of the group consisting of manganese and nickel, and in the essential absence of added water, at a temperature within the range of 100° to 300° C. and at a pressure within the range of 1 to 200 atmospheres, continuing said oxidation until the principal oxidation product is acrylic acid, and thereafter separating said acrylic acid from the resulting oxidation mixture.

The catalyst used in the present invention must be a salt of manganese or nickel, such as the chlorides, bromides, iodides, sulfates, phosphates, nitrates, acetates, naphthenates, benzoates, hexahydrobenzoates, isobutyrates, acrylates, chloroacetates, etc. of manganese or nickel. These salts may be employed singly or in combination with each other, or in combination with any and all salts, oxides or hydrides of metals having more than one state of valency, including mercury, copper, lead, titanium, zirconium, cerium, tin, thorium, vanadium, columbium, antimony, tantalum, bismuth, chromium, molybdenum, tungsten, uranium, iron, cobalt, ruthenium, rhodium, palladium, platinum, iridium, osmium, etc. In some instances, it is helpful to introduce a readily oxidizable material, such as acrolein, cyclohexanone, hexaphenyl ethane, acetone, or the like to assist in initiating the oxidation, or alternatively, for the same purpose, a reactive oxidizing agent such as ozone, a peroxide, bromine, or iodine (or a precursor thereof, such as hydrogen bromide or hydrogen iodide) may be introduced initially.

The oxidation takes place over a wide range of temperatures but is undesirably slow at temperatures below about 100° C. At temperatures above 300° C., yields are undesirably poor. The preferred range of temperature is from 125° C. to 250° C. The pressure is relatively uncritical, but should be sufficient to maintain a liquid reaction phase. Suitable pressures are within the range of from about 1 to 200 atmospheres, preferably about 5 to 100 atmospheres. The quantity of catalyst should be controlled so as to give the desired rate of oxidation since at any particular temperature level the percent conversion depends upon the content of catalyst. Suitable amounts of catalyst range from 1 part of catalyst (based on weight of metal) per million parts of solvent, up to about 10 parts per 100 parts of alkanoic acid, preferably about 0.5 to 5 parts per 100 parts of alkanoic acid.

The alkanoic acid functions as a solvent in the process of this invention. While acetic acid is generally the most practical solvent for use in the process of the invention, propionic acid is sometimes employed to reduce losses through volatilization and other acids, notably n-butyric, isobutyric, valeric, caproic, trichloroacetic, caprylic, capric, etc. acids may be employed. These alkanoic acids are liquids under the conditions of the process of this invention. The concentration of propylene in the solvent may be varied over the widest possible range, and in fact may be kept down to almost zero in embodiments involving simultaneous feeding of oxygen and propylene at rates about equal to the rate of reaction.

Relatively small amounts of water ordinarily will be present during the process reaction; for example, the liquid alkanoic acid employed may contain small amounts of water. Also a certain amount of water will inherently be produced by the reaction itself. However, the reaction should be conducted in the essential absence of added water.

The process may be operated either batchwise or continuously, and various forms of continuous operation are possible. Where the solvent is higher boiling than the acid formed in the oxidation, the latter can be distilled off continuously or periodically. When the acetic acid is used as the solvent, a constant flow type of continuous process is quite feasible, and the reaction product is distilled for recovery of acetic acid, acrylic acid, and catalyst tails. The recovered solvent and tails can be recycled to the oxidizer.

The reaction vessel may be made of or lined with suitable inert materials for best results. The reactor walls have a pronounced effect on the course of the reaction. Stainless steel is generally not very desirable, while platinum appears to be about the best wall material from the standpoint of yield of the desired products. Silver lined vessels are quite practical. Gold and other precious metals may be used. Titanium also is suitable, as is aluminum. Ceramics, including glass, quartz, and the like, may also be used as liners or materials of construction, if desired.

In general, the reaction time is controlled so as to produce acrylic acid as the principal reaction product. This may require, in some instances, several hours, and in other instances a time as short as one hour or less.

The invention is illustrated further by means of the following examples, wherein percentages are in terms of percent by weight.

*Example 1*

Into a suitable pressure reactor having a platinum metal liner and of 320 ml. capacity was charged 1 gram manganese acetate tetrahydrate, 1 ml. 48% aqueous hydrobromic acid, 100 ml. glacial acetic acid and 10 grams of propylene. Air, to the extent of 300 p.s.i., was charged to the tube which was then heated to 200° C. and held there for 4 hours with agitation. Analysis of the solution after completion of the reaction showed that propylene had been converted to acrylic acid to give a solution containing 3.1% acrylic acid. The remainder of the propylene was largely unchanged, and there was no acrolein odor in the product.

*Example 2*

The above example was repeated, but the air was admitted at 200 p.s.i., and then the pressure was increased to 800 p.s.i., while the temperature was increased to 200° C. After 2 hours at 200° C., the reaction mixture was found to contain 3.2% acrylic acid. Distillation of the reaction product showed material boiling below 200° C., constituting 3% of the total, and composed of water, 2-bromopropane (detected by gas chromatography) and possibly a base of acetone. The acetic acid was recovered in near quantitative amounts and acrylic acid was recovered in amounts constituting 3% of the weight of material charged, over a boiling range of 138 to 142° C. This was the principal oxidation product.

*Example 3*

Example 1 was repeated except that an unmodified stainless steel tube was used, and only <1% of the propylene was converted to acrylic acid, showing the retarding effect of the stainless steel. By doubling the catalyst concentrations the amount of propylene converted to acrylic acid was increased to 5%.

*Example 4*

Example 1 was repeated, but the amounts of catalyst, manganese acetate, and HBr were doubled. It was found that 22% of the propylene was converted to acrylic acid, the remainder of the propylene being present largely as unconverted propylene.

*Example 5*

Repetition of the run described in Example 1 but at a series of different temperatures showed that: at 100° C., less than 2% of the propylene is converted to acrylic acid; at 150° C., 9% of the propylene is converted to acrylic acid; and at 250° C., 8% of the propylene is converted to acrylic acid; and at 300° C., less than 1% of the propylene is converted to acrylic acid.

*Example 6*

Example 5 was repeated omitting the HBr modifier. The reaction was somewhat slower at the start, but the yield of acrylic acid was not adversely affected.

*Example 7*

Example 1 was repeated using 1 gram of nickel acetate as the catalyst in place of the manganese acetate tetrahydrate. The oxidation was conducted at 900 p.s.i. and 200° C. for 2 hours with agitation. The reaction mixture contained 3.5% acrylic acid, which was equivalent to a 23% conversion of propylene to acrylic acid.

It is to be understood that the foregoing examples are illustrative only, and are not to be regarded as limiting the invention. The process described in the examples may be modified as will occur to those who are skilled in the oxidation art. For example, various methods for removal of the oxidation product may be used, such as azeotropic distillation of one or more of the components.

I claim:

1. An oxidation process which comprises simultaneously contacting propylene, oxygen, alkanoic acid solvent, and salt of 1 to 100,000 parts by weight, per million parts by weight of said solvent, of catalytic metal from the group consisting of manganese and nickel, in liquid substantially anhydrous phase, at a temperature of 125° C. to 250° C. and a pressure of 5 to 200 atmospheres, continuing said contacting until acrylic acid is the principal oxidation product, and separating acrylic acid from the resulting reaction mixture.

2. Process according to claim 1 wherein said liquid phase also comprises a catalytic amount of bromine.

3. Process according to claim 2 wherein said alkanoic acid is acetic acid.

4. Process according to claim 3 wherein said liquid phase comprises 0.5 to 5 parts by weight of said catalytic metal per 100 parts by weight of said acetic acid.

References Cited by the Examiner

UNITED STATES PATENTS

| | | | |
|---|---|---|---|
| 2,260,409 | 10/1941 | Slotterbeck et al. | 260—533 |
| 2,369,182 | 2/1945 | Rust et al. | 260—533 |
| 2,421,392 | 6/1947 | Rust et al. | 260—533 |
| 2,649,477 | 8/1953 | Jacobs et al. | 260—533 |
| 2,825,740 | 3/1958 | Armstrong et al. | 260—533 |
| 2,833,816 | 5/1958 | Saffer et al. | 260—524 |
| 2,846,450 | 8/1959 | Bloch | 260—533 |
| 2,920,087 | 1/1960 | Hay | 260—533 |
| 2,992,272 | 7/1961 | Hay | 260—531 |
| 3,065,264 | 11/1962 | Koch et al. | 260—533 |

FOREIGN PATENTS

| | | |
|---|---|---|
| 557,550 | 11/1957 | Belgium. |
| 397,161 | 8/1933 | Great Britain. |
| 904,304 | 8/1962 | Great Britain. |

LORRAINE A. WEINBERGER, *Primary Examiner.*

LEON ZITVER, *Examiner.*

I. R. PELLMAN, *Assistant Examiner.*